(12) United States Patent
Sano

(10) Patent No.: US 7,535,508 B2
(45) Date of Patent: May 19, 2009

(54) OPTICAL ELEMENT AND IMAGE-PICKUP APPARATUS

(75) Inventor: Daisuke Sano, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 492 days.

(21) Appl. No.: 11/535,819

(22) Filed: Sep. 27, 2006

(65) Prior Publication Data

US 2007/0070236 A1   Mar. 29, 2007

(30) Foreign Application Priority Data

Sep. 28, 2005   (JP)   ............................. 2005-282007

(51) Int. Cl.
*H04N 9/083* (2006.01)
*H04N 5/225* (2006.01)
*G03B 27/28* (2006.01)

(52) U.S. Cl. ..................... 348/335; 348/290; 359/495

(58) Field of Classification Search ......... 348/290–292, 348/335, 340; 359/237, 238, 321, 247, 248, 359/494, 495, 497–499, 502
See application file for complete search history.

(56) References Cited

U.S. PATENT DOCUMENTS

| | | | | |
|---|---|---|---|---|
| 4,626,897 | A * | 12/1986 | Sato et al. | 348/273 |
| 6,392,803 | B2 * | 5/2002 | Osawa | 359/495 |
| 6,914,715 | B2 * | 7/2005 | Nakazawa et al. | 359/321 |
| 6,963,448 | B1 * | 11/2005 | Hayakawa | 359/494 |
| 7,106,389 | B2 * | 9/2006 | Katoh et al. | 349/8 |
| 2002/0149847 | A1 * | 10/2002 | Osawa et al. | 359/498 |
| 2004/0042078 | A1 * | 3/2004 | Osawa et al. | 359/495 |

FOREIGN PATENT DOCUMENTS

| | | |
|---|---|---|
| JP | 1972-18688 | 6/1972 |
| JP | 1972-18689 | 6/1972 |
| JP | 59-75222 | 4/1984 |
| JP | 60-164719 | 8/1985 |
| JP | 2001-147404 | 5/2001 |
| JP | 2002-107540 | 4/2002 |

* cited by examiner

*Primary Examiner*—Nhan T Tran
*Assistant Examiner*—Trung Diep
(74) *Attorney, Agent, or Firm*—Rossi, Kimms & McDowell, LLP

(57) ABSTRACT

An optical element is disclosed which has an excellent optical low-pass filter effect. The optical element has optical anisotropy and separates entering light into light rays having polarization directions perpendicular to each other. The optical element satisfies the following conditions: $0.1 < |n_e - n_o|$, and $\theta_{max} < \theta$. $n_o$ and $n_e$ represent refractive indices for ordinary and extraordinary rays at a wavelength of 530 nm, $\theta$ represents an angle between the direction of an optic axis of the optical element and a normal to an incident surface of the optical element, and $\theta_{max}$ represents an angle between the direction of the optic axis and the normal to the incident surface at which the angle of separation is maximized when the light that enters the incident surface of the optical element at the normal angle is separated into the light rays.

11 Claims, 14 Drawing Sheets

OPTICAL ELEMENT AND IMAGE-PICKUP APPARATUS

BACKGROUND OF THE INVENTION

The present invention relates to optical elements utilizing optical anisotropy to provide an optical low-pass filter effect and image-pickup apparatuses using the optical element such as digital cameras, video camcorders and the like with a solid-state image-pickup element (for example, a CCD sensor or a MOS sensor).

An image-pickup apparatus, such as digital camera and video camcorder, using a two-dimensional solid-state image-pickup element, such as a CCD sensor and a MOS sensor, acquire image information by sampling an object image on a pixel basis.

However, when an object having a spatial frequency component higher than the spatial frequency of the pixel pitch is picked up, the high frequency component is detected as an aliasing noise component at lower frequencies.

On the other hand, when a single-plate color image-pickup element is used to pick up an image of an object having a high spatial frequency component, there is generated a false-color noise determined by the layout of a color filter disposed in front of the pixels.

It is extremely difficult to remove such a noise component after the image information is converted into an electrical signal.

Conventionally, such a noise component has been removed using an optical low-pass filter.

The optical low-pass filter used herein is an optical member having an optical effect capable of removing a high spatial frequency optical signal. There is known an optical low-pass filter using a light separation effect of quartz (Japanese Utility Model Publication No. S47(1972)-18688, Japanese Utility Model Publication No. S47(1972)-18689, Japanese Patent Laid-Open No. S59(1984)-75222, and Japanese Patent Laid-Open No. S60(1985)-164719).

An optical low-pass filter using quartz utilizes a light separation effect by an anisotropic optical medium to obtain a low-pass effect.

In Japanese Utility Model Publication No. S47-18688 and Japanese Utility Model Publication No. S47-18689, a stripe filter is contemplated as a color filter and an optical low-pass filter is used to reduce a false-color signal generated when the spatial frequency of an object is synchronized with the color filter.

Specifically, the above two patent documents disclose an optical low-pass filter in which a plane-parallel plate with birefringence, such as quartz, is used to separate light into ordinary and extraordinary rays, which are then focused on an image-pickup plane.

Japanese Utility Model Publication No. S47-18689 discloses a configuration in which single-crystal quartz is cut out such that its optic axis is inclined substantially 45 degrees to the incident/emergent surface of the plane-parallel plate.

In Japanese Patent Laid-Open No. S59-75222 and Japanese Patent Laid-Open No. S60-164719, a Bayer-layout color filter is contemplated as a color filter, for example, and a plurality of birefringent plates are combined to separate entering light into ordinary and extraordinary rays, which then exit therefrom and form an image. This configuration effectively reduces a spurious-resolution signal and a false-color signal which are generated by high frequency components of an object.

There is further known an optical element having a light separation effect of an anisotropic medium that exhibits stronger anisotropy than that of quartz (Japanese Patent Laid-Open No. 2001-147404 and Japanese Patent Laid-Open No. 2002-107540).

Japanese Patent Laid-Open No. 2001-147404 discloses an optical low-pass filter with thinner mechanical thickness by using lithiumniobate, which exhibits stronger anisotropy than quartz, to provide a larger light ray separation width per unit thickness.

However, a material that exhibits too strong anisotropy typically provides too large width of separation, resulting in a too thin optical element for a desired width of separation. This leads to difficult material processing and reduced mechanical strength.

Therefore, in Japanese Patent Laid-Open No. 2001-147404, the angle θ between the normal to the surface and the optic axis of the optical element is set within a range of 10°<θ<30° or 60°<θ<80°, which deviates from 45° at which the width of separation is maximized.

In Japanese Patent Laid-Open No. 2002-107540, a single-crystal lithium niobate is cut into a parallel plate to form an optical low-pass filter.

Japanese Patent Laid-Open No. 2002-107540 discloses a configuration in which a normal to the principal plane of the single crystal that is cut out is within a range of ±3° around the z axis of the crystal from a position that is rotated around the x axis by 46.1±20° or 133.9±20° from the y axis.

The difference in the refractive indices of lithium niobate is typically greater than that of quartz, which facilitates achieving a thinner mechanical thickness.

When light enters a plane-parallel plate made of an anisotropic medium in which the angle between the optic axis and the normal to the incident surface thereof is specified, the width of separation of exit light rays varies depending on the incident angle of the light. That is, different optical low-pass filter effects will be provided for different incident angles of the light.

Thus, in an image-pickup apparatus using an optical low-pass filter, when light rays enter the optical low-pass filter at different incident angles, it is difficult to achieve a uniform optical low-pass filter effect on the entire image.

Therefore, in an optical low-pass filter using an anisotropic medium, it is important to appropriately set the refractive index of the material, the direction of the optic axis with respect to the normal to the incident surface, the thickness and the like to reduce variation in light separation width caused by variation in incident angle.

An object of the present invention is to provide anoptical element capable of reducing variation in light separation width with respect to variation in incident angle of entering light and having there by an excellent optical low-pass filter effect, and an image pick-up apparatus with the an optical element.

According to an aspect, the present invention provides an optical element having optical anisotropy, the optical element separating entering light into light rays having polarization directions perpendicular to each other such that the light rays are separated by a specific width and exit from the optical element. The optical element satisfies the following conditions:

$$0.1 < |n_e - n_o|$$

$$\theta_{max} < \theta$$

where $n_o$ and $n_e$ represent refractive indices for ordinary and extraordinary rays at a wavelength of 530 nm, θ represents an angle between the direction of an optic axis of the optical element and a normal to an incident surface of the optical element, and $\theta_{max}$ represents an angle between the direction of the optic axis and the normal to the incident surface at which the angle of separation is maximized when the light that enters the incident surface of the optical element at the normal angle is separated into the light rays having the polarization directions perpendicular to each other.

According to another aspect, the present invention provides an optical element separating entering light into light rays having polarization directions perpendicular to each other such that the light rays are separated by a specific width and exit from the optical element. The optical element satisfies the following condition:

$$50° < \theta < 60°$$

where the optical element is made of lithium niobate, and $\theta$ represents an angle between the direction of an optic axis of the lithium niobate and a normal to an incident surface of the optical element.

According to another aspect, the present invention provides an optical element separating entering light into light rays having polarization directions perpendicular to each other such that the light rays are separated by a specific width and exit from the optical element. The optical element satisfies the following condition:

$$51° < \theta < 61°$$

where the optical element is made of quartz, and $\theta$ represents an angle between the direction of an optic axis of the quartz and a normal to an incident surface of the optical element.

According to yet another aspect, the present invention provides an image-pickup member which comprises the optical element according to one of the above ones, and a solid-state image-pickup element. The optical element is located on the light-entering side of the solid-state image-pickup element.

According to yet another aspect, the present invention provides an image-pickup apparatus which uses the above-described image-pickup member to photoelectrically convert an optical image formed by an image-pickup optical system.

According to yet another aspect, the present invention provides an image-pickup apparatus which comprises an optical element having optical anisotropy, and a solid-state image-pickup element which receives an optical image formed by an image-pickup optical system through the optical element. The image-pickup apparatus satisfies the following conditions:

$$0.02 < |n_e - n_o|$$

$$\theta_{max} < \theta$$

$$p/t < 0.035$$

where $n_o$ and $n_e$ represent refractive indices for ordinary and extraordinary rays at a wavelength of 530 nm, $\theta$ represents an angle between the optic axis direction of the optical element and the normal to the incident surface of the optical element, $\theta_{max}$ represents the angle between the direction of an optic axis and a normal to an incident surface at which the angle of separation is maximized when light that enters the incident surface of the optical element at the normal angle is separated into light rays having polarization directions perpendicular to each other, t represents the thickness of the optical element in the direction of the normal to the incident surface, and p represents the pixel pitch of the solid-state image-pickup element in the direction of the light separation.

Other objects and features of the present invention will become readily apparent from the following description of the preferred embodiments with reference to accompanying drawings.

DETAILED DESCRIPTION OF THE PREFERRED EMBODIMENTS

Figure 1:
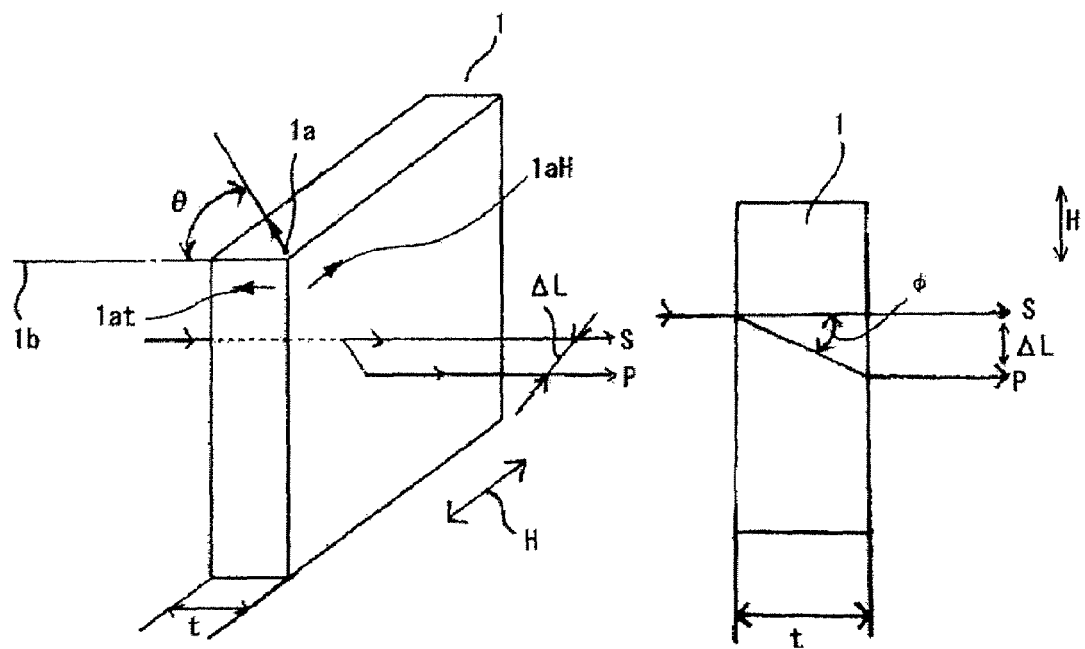
FIG. 1 is a schematic view of the main portion of an optical element that is an embodiment of the present invention.

FIG. 1 is a perspective view of the main portion of an optical element having an optical low-pass filter effect that is an embodiment of the present invention utilizing a light separation effect of an optical anisotropic medium. Examples of known optical anisotropic media include crystalline materials, such as quartz and lithium niobate, and a resin film configured to have optical anisotropy.

In FIG. 1, 1 denotes the optical element having an optical low-pass filter effect. 1a denotes the optic axis of the material that forms the optical element. The optic axis 1a and the normal 1b to the incident surface form an angle θ. 1at and 1aH denote orthogonal projections of the optic axis 1a to respective surfaces.

When light enters the optical element 1 at the normal angle (that is, perpendicularly), the optical element 1 separates the entering light into P-polarized light P and S-polarized light S with a width of separation ΔL in the horizontal direction H, which then exit the optical element 1.

An anisotropic medium used herein refers to a medium whose refractive index changes depending on the polarization direction (oscillation direction). The anisotropic medium has an optic axis which extends in a direction in which normal velocities of the two polarized light coincide with each other.

A medium, such as quartz, in which among three directions, the refractive index in one direction differs from those in the other two directions, is called a uniaxial crystal. The direction associated with the different refractive index is the optic axis.

This anisotropic medium is cut in to a plane-parallel plate such that its optic axis is inclined to the normal to the incident/emergent surface by a predetermined angle. When circularly polarized light enters this plane-parallel plate, the entering light exhibits anisotropy in the inclined direction of the optic axis, and is separated into ordinary and extraordinary rays, which exit from the plane-parallel plate. The width of separation between the ordinary and extraordinary rays is determined by the refractive index and thickness of the anisotropic mediumas well as the angle between the optic axis and the normal to the incident surface.

Figure 2:
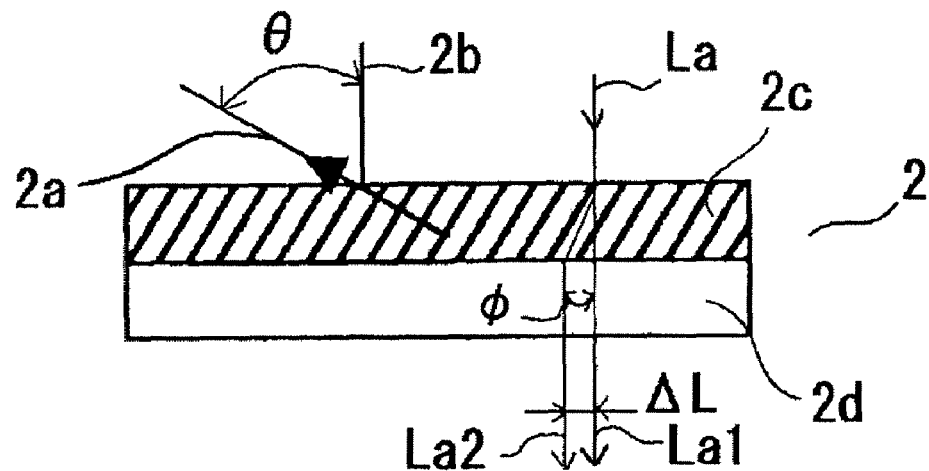
FIG. 2 is a cross-sectional view of the main portion of the optical element.

FIG. 2 is a cross-sectional view of the main portion of the optical element having a light separation effect obtained by optical anisotropy of a structure smaller than the wavelength of light is used to separate entering light.

In FIG. 2, 2 denotes the optical element, which is formed of a one-dimensional periodic structure in which rectangular grating components smaller than the wavelength of light are arranged in one direction to form a periodic structure shown in FIG. 10, which will be described later.

In FIG. 2, 2a denotes the optic axis, which forms an angle θ with the normal 2b to the incident surface.

2c denotes a rectangular grating (periodic structure), which is disposed diagonal to a substrate 2d.

The figure shows entering light La passing through the optical element 2 and exiting therefrom after separated into two light rays La1 and La2 with a width of separation ΔL.

In this embodiment, the optical element having optical anisotropy is formed of a one-dimensional periodic structure in which grating components smaller than the wavelength of the entering light are arranged with a constant pitch.

In FIGS. 1 and 2, when the optical element separates the entering light into two light rays (polarized light) S and P, an angle between the optic axis 1a and the normal 1b to the incident surface at which an angle of separation φ is maximized is defined as $θ_{max}$.

When $n_o$ and $n_e$ represent refractive indices for the ordinary and extra ordinary rays, the optical element satisfies the following conditions:

$$0.1 < |n_e - n_o| \tag{1}$$

$$θ_{max} < θ \tag{2}$$

An exemplary medium that satisfies the conditional expression (1) is titanium oxide crystal ($TiO_2$). The refractive indices of titanium oxide crystal for the ordinary and extraordinary rays are 2.6485 and 2.9454 at a wavelength of 550 nm, respectively.

Figure 3:
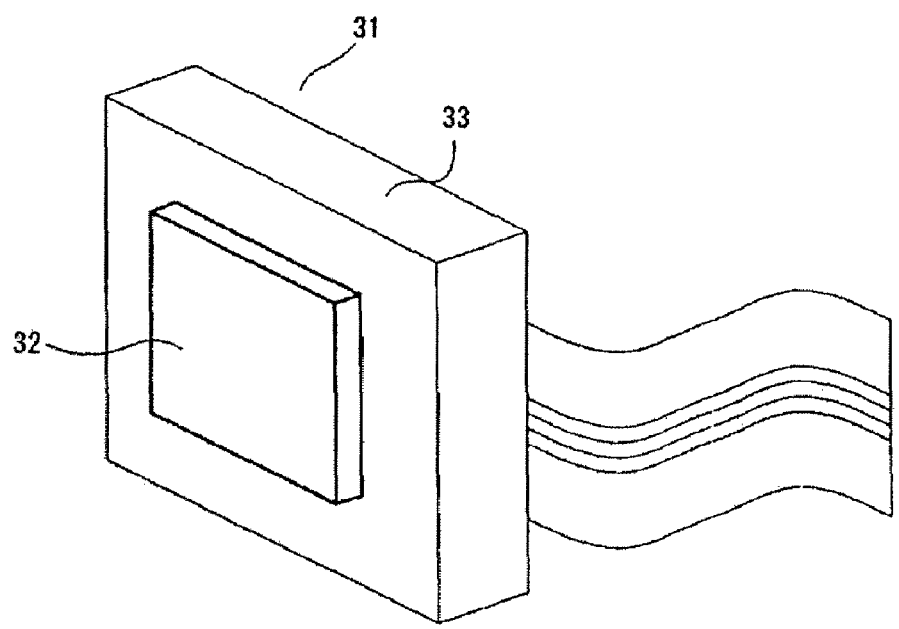
FIG. 3 explains an image-pickup member having the optical element.

FIG. 3 is a schematic view of an image-pickup member in which the optical element according to the present invention is attached on the ray-entering side of a solid-state image-pickup element, such as a CCD sensor and a CMOS sensor.

In FIG. 3, 31 denotes the image-pickup member and 32 denotes the optical element having an optical low-pass filter effect. 33 denotes the solid-state image-pickup element, which is provided with the optical element 32 on the ray-entering side.

The characteristics of the optical element according to the present invention will now be described.

In anoptical low-pass filter using a medium or a structure that has an optical anisotropy to separate light, the direction of separation and the width of separation of the light are determined by three parameters, that is, a refractive index difference between the ordinary and extraordinary rays, the thickness, and an angle of the optic axis (hereinafter referred to as an optic axis angle).

In general, when circularly polarized light perpendicularly enters a plane-parallel plate made of a uniaxial crystal that is formed such that the normal to the incident surface and the optic axis form an angle θ, the angle φ between the directions in which the ordinary and extraordinary rays travel is expressed in the following expression:

$$\tan φ = \frac{(n_e^2 - n_o^2)\sin θ \cos θ}{n_e^2 \cos^2 θ + n_o^2 \sin^2 θ} \tag{a1}$$

where $n_o$ represents the refractive index for the ordinary ray and $n_e$ represents the refractive index for the extraordinary ray.

The width of separation ΔL when the entering light is separated into two exit light rays is determined by the following expression:

$$\Delta L = t \times \tan\phi \tag{a1'}$$

where t represents the thickness of the optical element.

To consider the expression (a1), interpretation in terms of wave optics is required. In an anisotropic medium, since the optical refractive index changes depending on the polarization direction, it is observed that the directions of the wave vector and the pointing vector of the light do not coincide. In other words, it indicates that the direction of the wavefront of the light and the direction in which the energy actually flows do not coincide.

Figure 4:
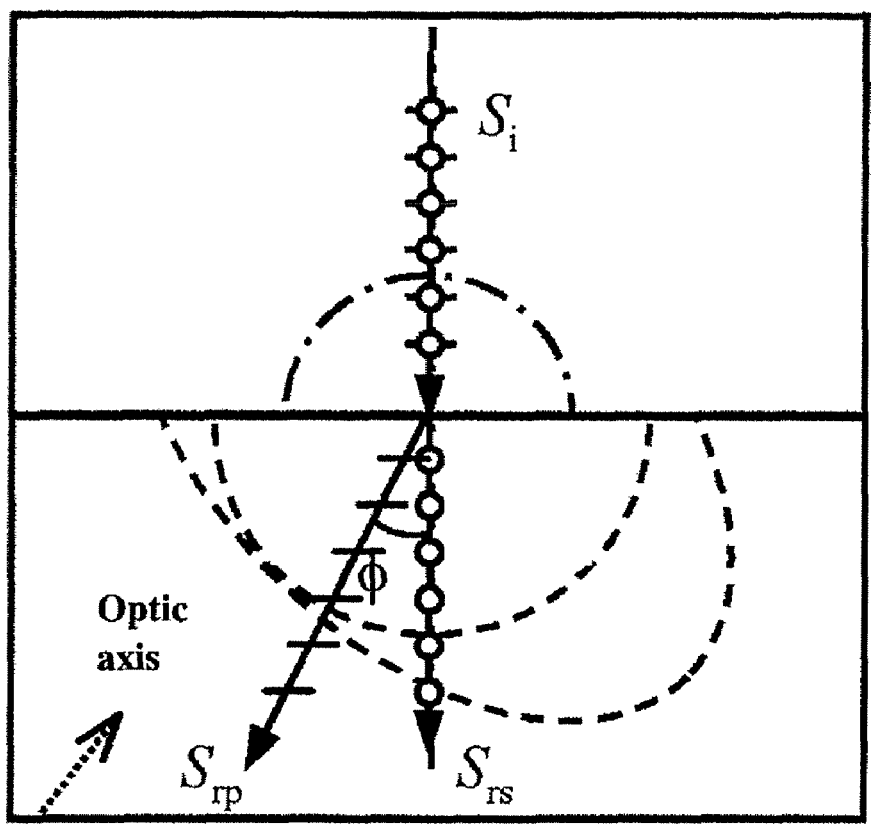
FIG. 4 explains separation of the light entering an anisotropic medium at the normal angle due to deviation of a pointing vector S.

When light enters a plane-parallel plate at the normal angle, although the orientation of the wavefront does not change after the light enters the medium, the direction in which the energy flows deviates. Thus, it is observed that the light is refracted even for normal incidence. FIG. 4 schematically shows this phenomenon.

FIG. 4 shows the separation of light associated with the pointing vector and how the entering light separates with respect to the optic axis.

In the figure, $S_i$ represents the entering light, and $S_{rs}$, and $S_{rp}$ represent the S- and P-polarized light components, respectively.

Figure 5:
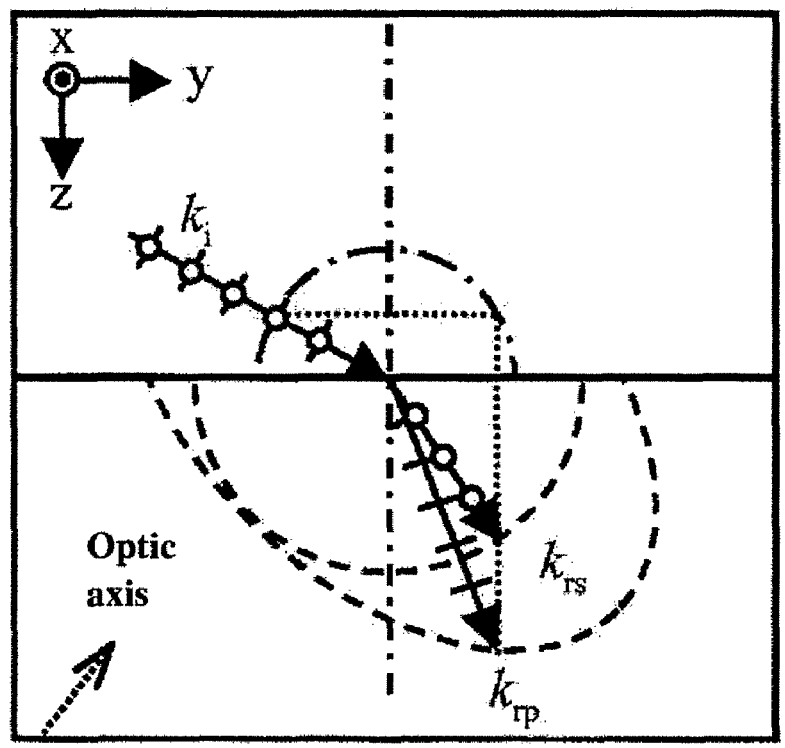
FIG. 5 explains separation of the light entering an anisotropic medium at a non-zero angle due to deviation of a wave vector k.

Consider now a case where the light enters the plane-parallel plate at an oblique angle. In general, when the light enters an interface at a non-zero incident angle (that is, an incident angle that is not zero), the light is refracted in such a way that it satisfies the Snell's law. In the case of an anisotropic medium, however, since the refractive index changes depending on the polarization direction, each polarized light is refracted in such a way that it satisfies its own Snell's law expression. FIG. 5 schematically shows this situation.

When the optic axis is in the planar surface of incidence, the entering light is separated into the S-wave that oscillates in the direction perpendicular to the paper plane of the figure and the P-wave that oscillates in the direction parallel to the paper plane. When $n_s$ and $n_p$ represent refractive indices for the S-wave and P-wave in the medium, respectively, they are determined by the following expressions:

$$ns = no \tag{a2}$$

$$n_p = \left( \frac{(y\cos\theta - z\sin\theta)^2}{n_o^2} + \frac{(y\sin\theta - z\cos\theta)^2}{n_e^2} \right)^{-\frac{1}{2}} \tag{a3}$$

These expressions show that $n_s$ is constant and $n_p$ is a function of y and z, that is, $n_p$ changes depending on in which direction the P-wave travels. Now, when $n_i$ represents the refractive index of the incident medium, $\theta_i$ represents the incident angle of the light, and $\theta_{rs}$ and $\theta_{rp}$ represent angles of refraction of the respective polarized light rays, they satisfy the following expression:

$$n_i \sin\theta_i = n_s \sin\theta_{rs} = n_p \sin\theta_{rp} \tag{a4}$$

The wave vectors k travel in the directions of the angles of refraction $\theta_{rs}$ and $\theta_{rp}$ determined by this expression. This is the separation of the light associated with the wave vector.

With all things mentioned above considered, when the light enters an anisotropic medium at a non-zero incident angle, the separation of the light at the interface (boundary surface) due to deviation of the wave vector is determined in such a way that the separation satisfies the expression (a4). For the determined direction of the wave vector, further separation that satisfies the expression (a1) occurs due to deviation of the pointing vector. Importantly, attention should be paid to the way in which the angle θ is handled in the expression (a1).

Figure 6:
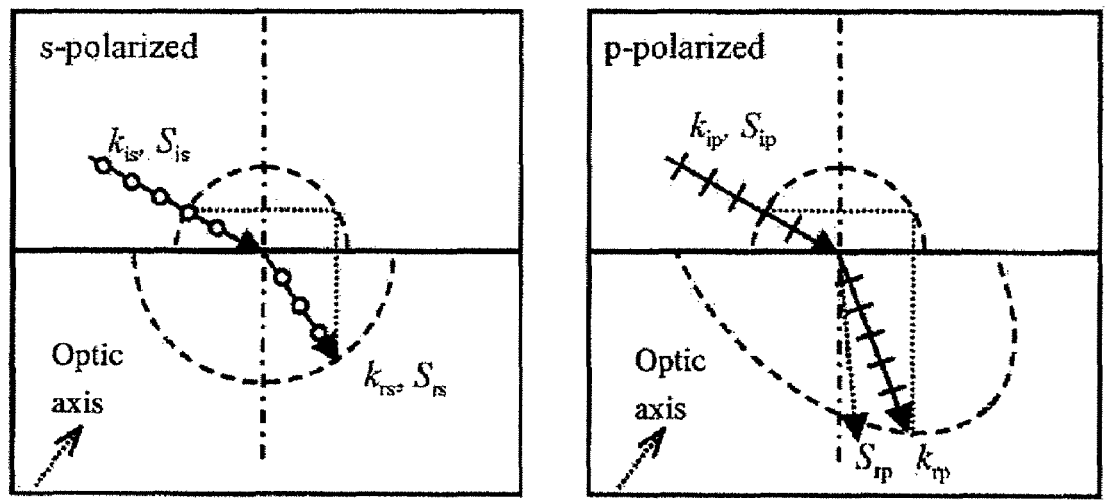
FIG. 6 explains how each of S- and P-waves of the light entering an anisotropic medium at a non-zero angle is refracted.

Since normal incidence is assumed in the expression (a1), the angle θ used in the expression (a1) represents simply the angle between the normal to the incident surface and the optic axis. However, in a strict sense, the angle θ in the expression (a1) represents the angle between the optic axis and the wave vector k. If this θ is used, the S-wave is refracted at the interface at an angle that satisfies the Snell's law and the pointing vector will not deviate from the wave vector, as shown in FIG. 6. The P-wave is refracted at an angle different from that of the S-wave and the pointing vector deviates at that point. It is essential to pay attention to the pointing vector directions of the two polarized light rays to determine the width of separation.

Figure 7:
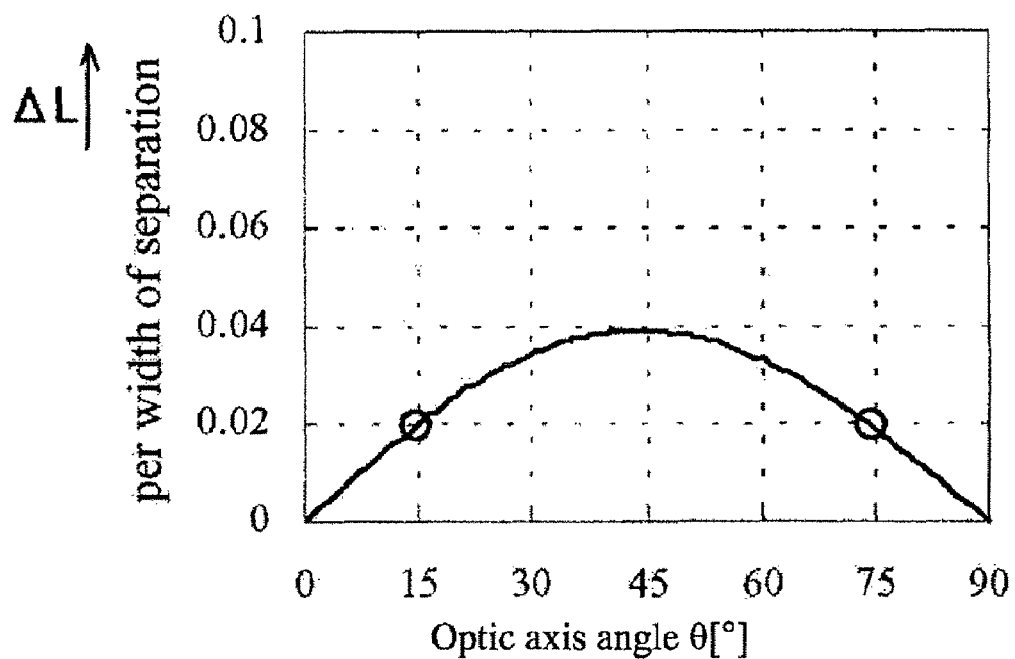
FIG. 7 explains the relationship between the optic axis angle of lithium niobate and the width of separation for normal incidence at a wavelength of 530 nm.

As an optical anisotropic medium, lithium niobate has a refractive index $n_o$ of 2.3247 for the ordinary ray and a refractive index $n_e$ of 2.2355 for the extraordinary ray at a wavelength of 530 nm. These values are used to derive the relationship between the optic axis angle and the width of separation for normal (or perpendicular) incidence, which is shown in FIG. 7. For crystal having relatively small refractive index difference, such as lithiumniobate (0.0892), the optic axis angle that maximizes the value of the expression (a1) is about 45 degrees, and the width of separation per unit thickness is 0.03911 at that angle.

Figure 8:
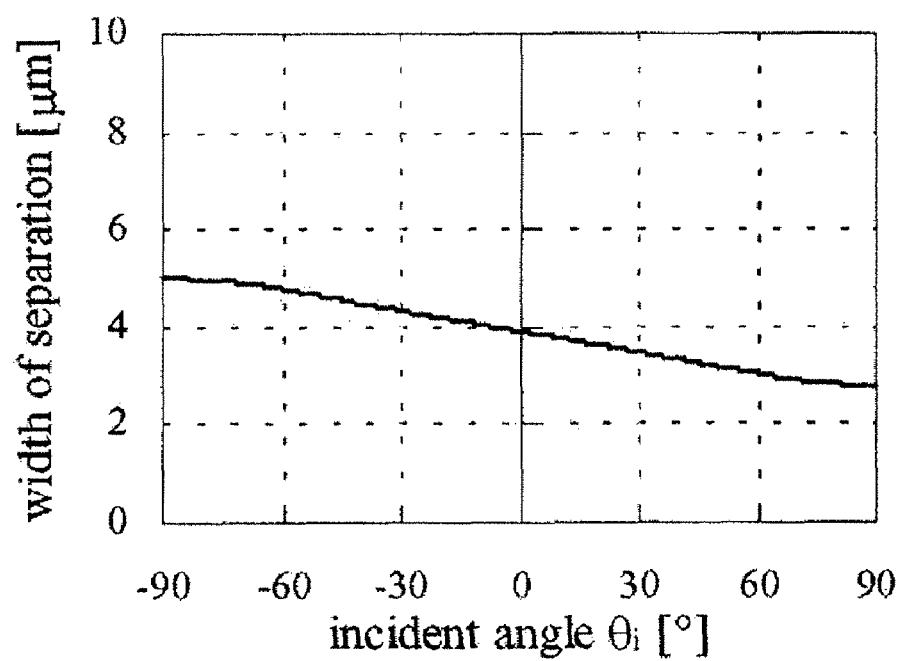
FIG. 8 explains the relationship between the incident angle and the width of separation at a wavelength of 530 nm when the optic axis angle of lithiumniobate is set at 45 degrees and the thickness is 100 μm.

FIG. 8 shows the relationship between the incident angle and the width of separation when the optic axis angle is 45 degrees and the thickness is 100 μm. It shows variation of the width of separation at various incident angles with reference to the width of separation of 3.9 μm at the incident angle of 0 degree. Since the width of separation is basically in proportion to the thickness, the amount of variation of the width of separation increases with the thickness.

When the mechanical thickness and the width of separation are specified as a design guideline, it is necessary to adjust the optic axis angle θ in order to obtain a desired width of separation ΔL.

Figure 9A:
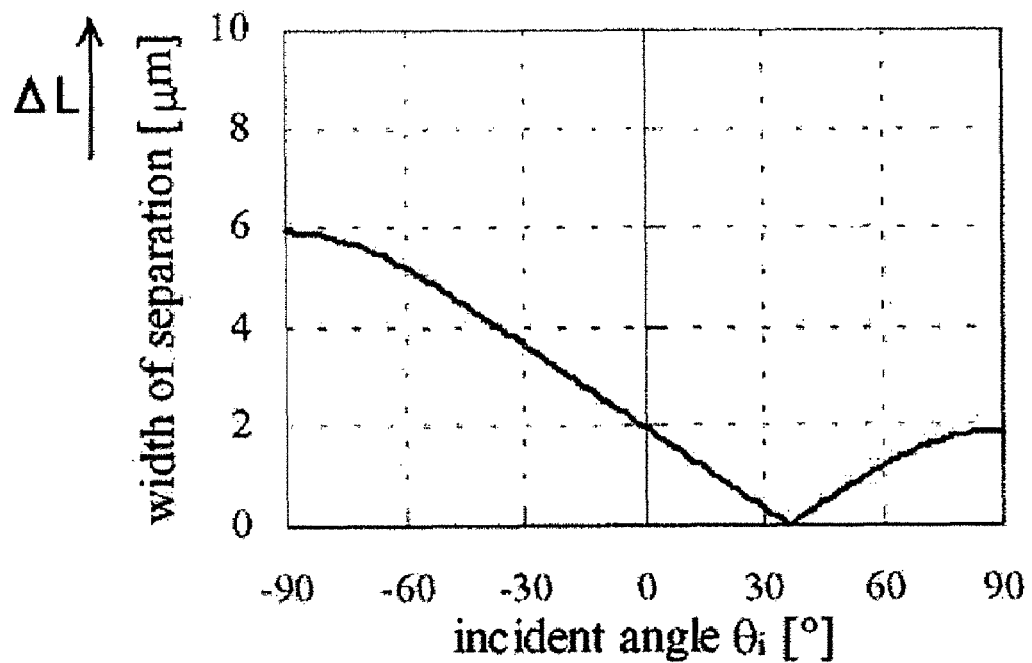
FIGS. 9A and 9B explain the relationship between the incident angle and the width of separation at a wavelength of 530 nm when the thickness of lithium niobate is 100 μm and the optic axis angle is set (9A) at 15 degrees and (9B) at 74 degrees.
Figure 9B:
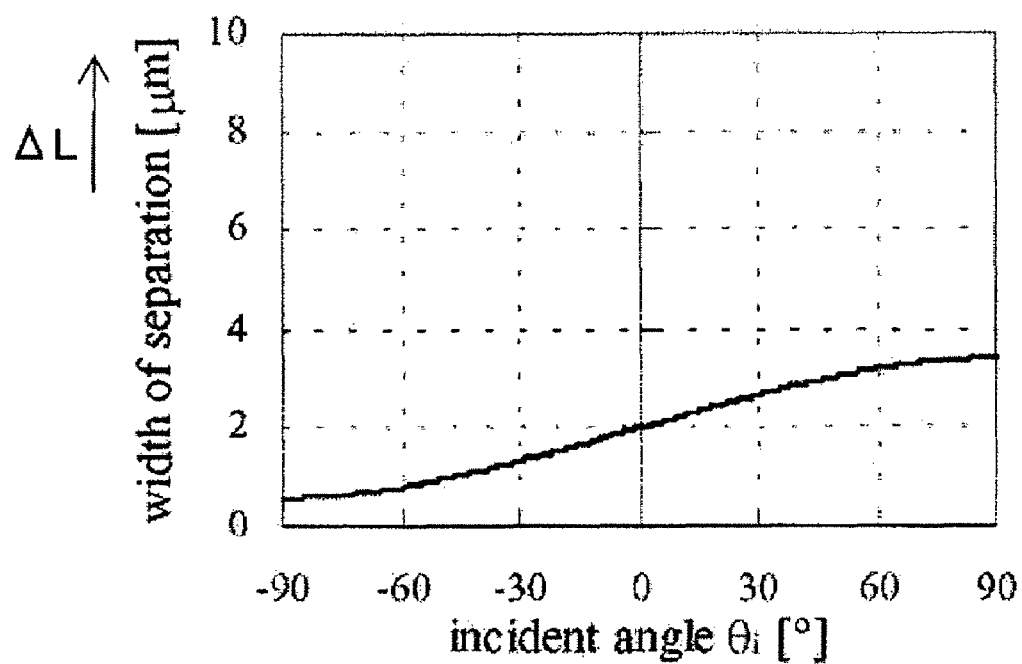

If the width of separation is 2 μm for the thickness of 100 μm, the required width of separation per unit thickness is 0.02 μm, and hence the optic axis angles θ are 15 and 74 degrees from FIG. 7. FIGS. 9A and 9B show the relationship between the incident angle θi and the width of separation ΔL. Although the width of separation at an incident angle of 0 degree is about 2 μm for the both incident angles, the variation amount of the width of separation ΔL at an non-zero incident angle θi when the optic axis angle is set at 15 degrees is larger than that when the optic axis angle is set at 74 degrees.

When the optic axis angle is set at 15 degrees, the width of separation temporarily becomes zero around at an incident angle of about 35 degrees. This is because the wave vector of the light in the medium travels in the optic axis direction, so that no deviation of the wave vector at the interface and no deviation of the pointing vector in the medium occur.

The direction in which the ordinary and extraordinary rays separate is inverted at an incident angle of about 35 degrees, so that such design is not preferable.

Description will now be given of an optical element having a light separation effect utilizing optical anisotropy of a structure smaller than the wavelength of light, such as the embodiment shown in FIG. 2.

Figure 10:
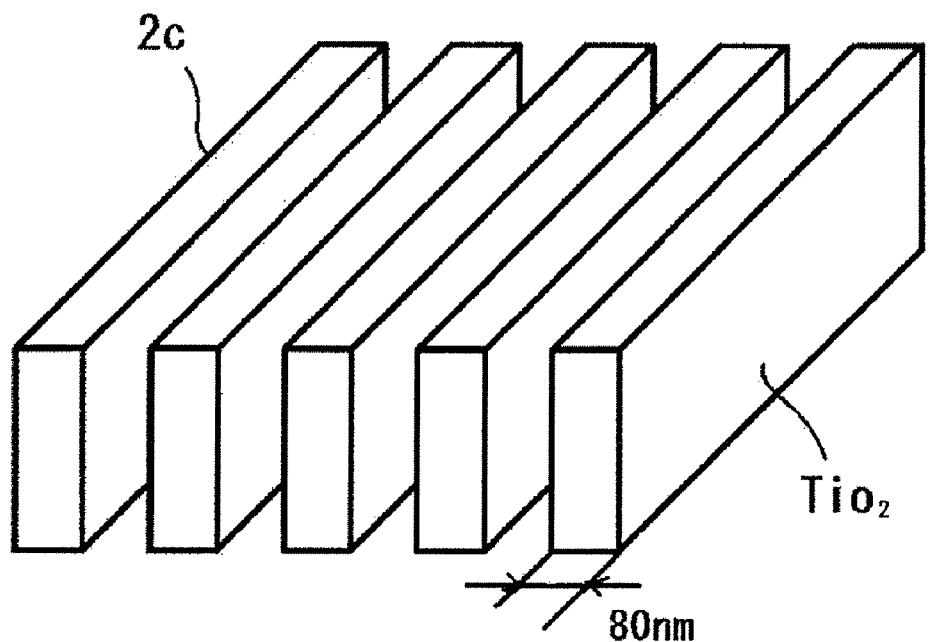
FIG. 10 is a diagrammatic view of a periodic structure.

The periodic structure of the optical element 2 shown in FIG. 2 is a one-dimensional periodic structure as shown in FIG. 10. When the pitch of the periodic structure 2c is smaller than the wavelength of light, the light cannot recognize that periodic structure and hence behaves as if the structure were a uniform medium.

Anisotropy of such the periodic structure 2c is greater than that of typical crystalline materials.

Figure 11:
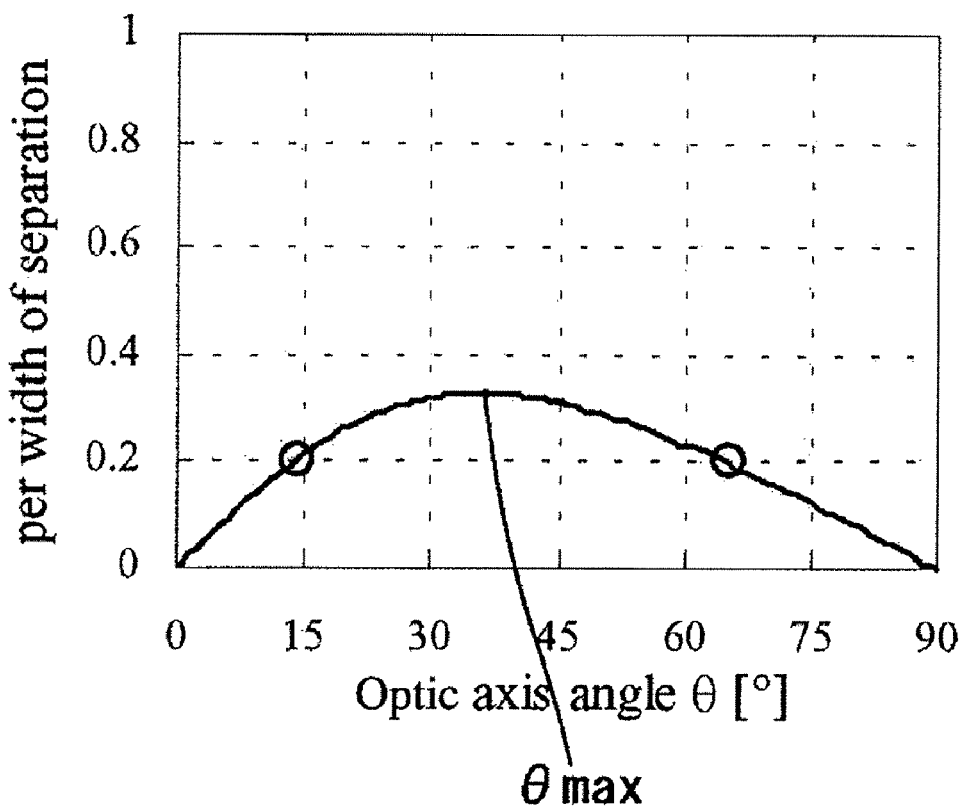
FIG. 11 explains the relationship between the optic axis angle of a $TiO_2$ periodic structure and the width of separation for normal incidence at a wavelength of 530 nm.

For the following discussion, assume that the medium of the periodic structure 2c is $TiO_2$ and the structure has a pitch of 80 nm and a $TiO_2$ occupancy rate of 50%. In this case, the effective refractive index method is used to derive the refractive index $n_o$ of about 1.8252 for the ordinary ray and the refractive index $n_e$ of about 1.3209 for the extraordinary ray at a wavelength of 530 nm. FIG. 11 shows the relationship between the angle of the optic axis 2a and the width of separation for normal incidence obtained by using the above values. The maximum width of separation for normal incidence is obtained when the optic axis angle is set at about 36 degrees, and the width of separation per unit thickness is 0.32904 at that angle. This value is about one order of magnitude greater than that of lithium niobate.

Figure 12:
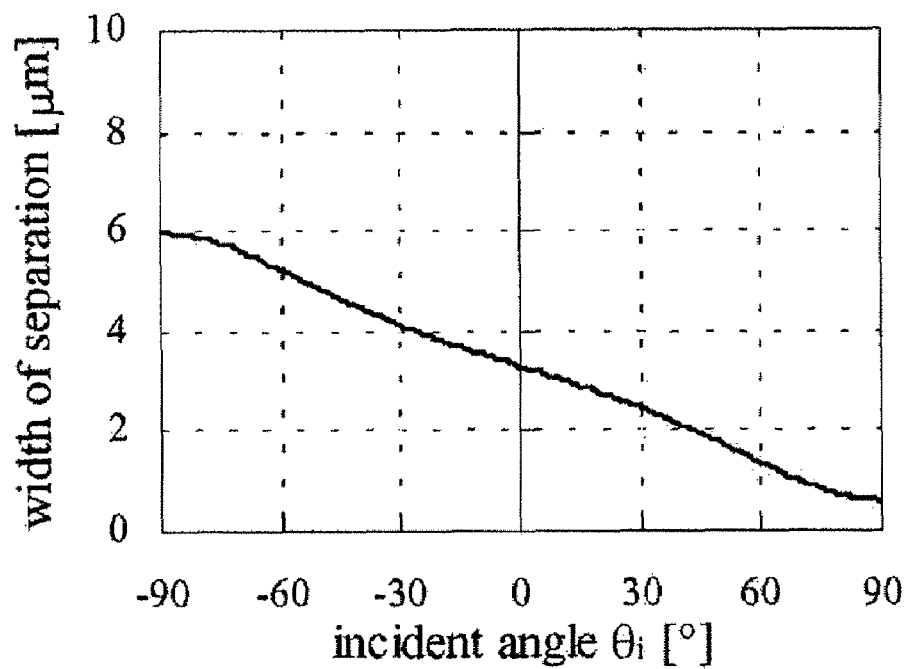
FIG. 12 explains the relationship between the incident angle and the width of separation at a wavelength of 530 nm when the optic axis angle of a $TiO_2$ periodic structure is set at 36 degrees and the thickness is 10 μm.

FIG. 12 shows the relationship between the incident angle and the width of separation when the optic axis angle is set at 36 degrees and the thickness is 10 μm. It is seen from the figure that the variation amount of the width of separation ΔL with respect to the incident angle θi is larger than that of lithium niobate shown in FIG. 8. By using an optical element that exhibits greater anisotropy to select an optic axis angle at which the maximum width of separation is obtained, the thickness for a desired width of separation can be reduced.

It is seen, however, that the change in incident angle affects the width of separation in a greater manner.

Figure 13A:
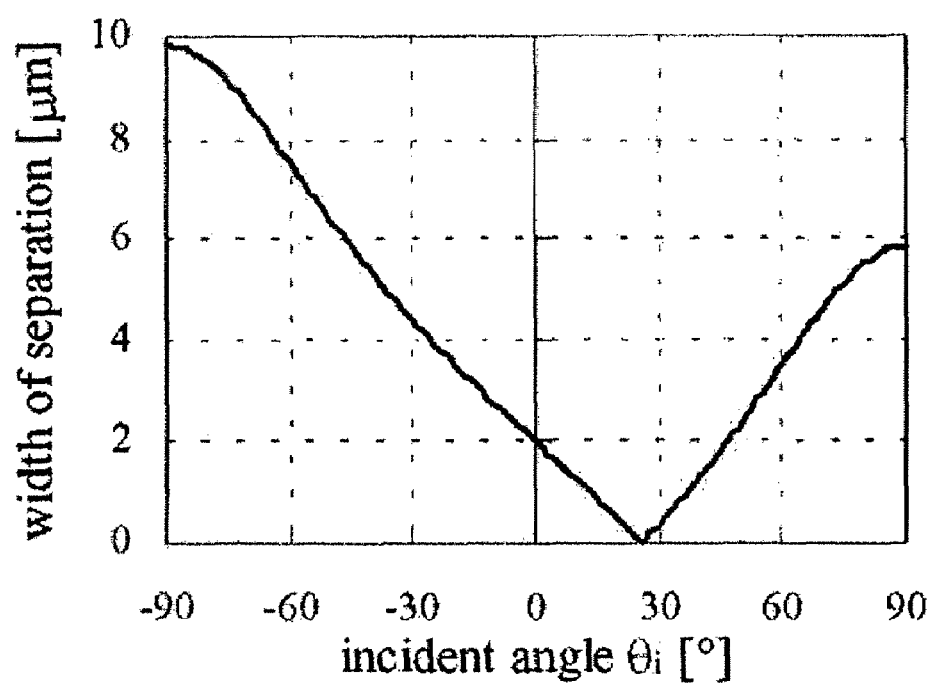
FIGS. 13A and 13B explain the relationship between the incident angle and the width of separation at a wavelength of 530 nm when the thickness of a $TiO_2$ periodic structure is 10 μm and the optic axis angle is set (13A) at 14 degrees and (13B) at 65 degrees.
Figure 13B:
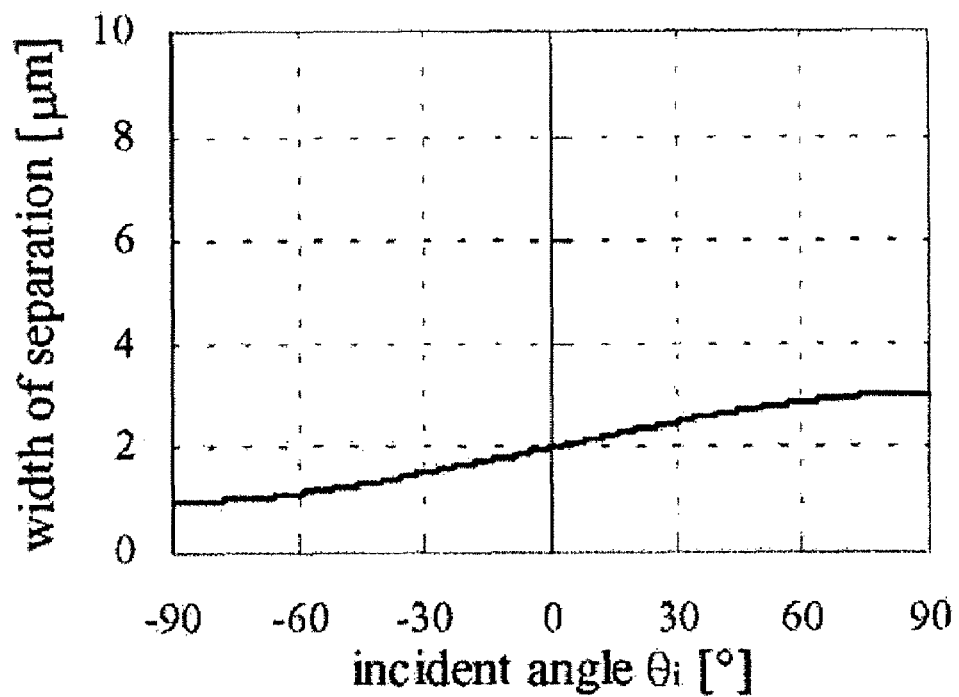

If the width of separation is designed to be 2 μm for the thickness of 10 μm, the optic axis angles are 14 and 65 degrees from FIG. 11. FIGS. 13A and 13B show the relationship between the incident angle and the width of separation. Although the width of separation at 0 degree is about 2 μm for the both incident angles, the width of separation significantly changes with respect to the incident angle when the optic axis angle is set at 14 degrees. Thus, when an optical element that exhibits strong anisotropy is used, the change in width of separation is significantly large depending on the range within which the optic axis angle is set.

In general, when such an optical element having an optical low-pass filter effect is used in combination with an image-pickup apparatus, the width of separation is set such that it corresponds to the pixel pitch of the sensor (image-pickup element) in the image-pickup apparatus.

For the following discussion, the pixel pitch p of the solid-state image-pickup element is set to 10 μm. Thus, the spatial frequency of the solid-state image-pickup element is 100 $mm^{-1}$.

From the sampling theorem, the spatial frequency of information that the solid-state image-pickup element can reproduce is 50 $mm^{-1}$. Information in the higher spatial frequency range, when sampled, is folded back to lower frequencies. This causes a kind of aliasing noise called moire.

Figure 14:
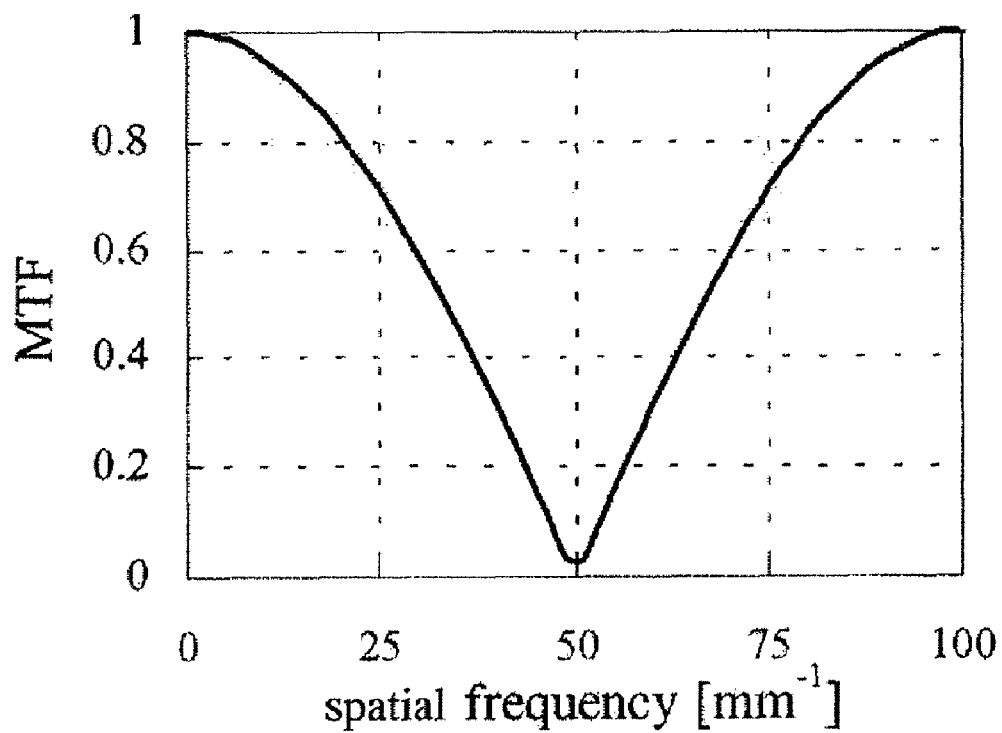
FIG. 14 explains the relationship between the MTF and the spatial frequency of a light separating optical element when the width of separation is 10 μm.

To eliminate this, a light separating optical element that separates light in the pitch direction by 10 μm is disposed in front of the image-pickup element. FIG. 14 shows the MTF in this configuration. It is seen that this light separating optical element functions as an optical low-pass filter that completely blurs information at a spatial frequency of 50 $mm^{-1}$. Thus, high-frequency noise components can be removed.

When an optical element that provides a large change in width of separation with respect to the incident angle is used, the low-pass filter effect disadvantageously changes depending on the position of the image (angle of view). That is, it is conceivable that the amount of change in width of separation directly affects the image.

The greater the change in width of separation with respect to the incident angle, as well as the smaller the pixel pitch p of the solid-state image-pickup element, the more it affects the image. The stronger the anisotropy of the material that is used, as well as the thicker the thickness t, the greater the change in width of separation.

Consequently, in the present invention, the optic axis angle is appropriately set to restrict the change in width of separation with respect to the incident angle, thereby providing an optical element having a higher performance, anisotropic point image separation effect.

The optical element of the present invention is disposed between the solid-state image-pickup element, such as CCD and MOS sensors, and an image-pickup optical system. The optical element is suitable as an optical low-pass filter that separates a point image (or image) corresponding to the pixel pitch of the solid-state image-pickup element.

The optical element uses a birefringent plate made of a uniaxial single crystal in which the refractive index for the ordinary ray greatly differs from that of the extraordinary ray or a one-dimensional periodic structure in which grating components smaller than the wavelength of entering light are arranged at a constant pitch.

An embodiment in which the optical element of the present invention is applied to an image-pickup apparatus will now be described.

The optical element of this embodiment has optical anisotropy characterized in that when the entering light exits from the optical element, the entering light is separated into light rays having polarization directions (polarization states) perpendicular to each other and a desired width of separation. The optical elemental so satisfies the following conditions:

$$0.02 < |n_e - n_o| \tag{3}$$

$$\theta_{max} < \theta \tag{4}$$

$$p/t < 0.035 \tag{5}$$

where $n_o$ and $n_e$ represent the refractive indices for ordinary and extraordinary rays at a wavelength of 530 nm, θ represents an angle between a direction of the optic axis and the normal to the incident surface of the optical element, $\theta_{max}$ represents an angle between the direction of the optic axis and the normal to the incident surface at which the angle of separation is maximized when light that enters the incident surface of the optical element at the normal angle is separated (refracted) into light rays with polarization states perpendicular to each other, t represents the thickness in the direction of the normal to the incident surface, and p represents the pixel pitch of the solid-state image-pickup element in the direction of light separation.

In this embodiment, by thus appropriately setting the angle θ between the optic axis and the normal to the incident surface of the optical element, the change in width of separation with respect to the incident angle is reduced.

In this way, the change in width of separation with respect to the incident angle that will occur in the optical element prepared for a desired width of separation is suppressed. Such an optical element is used for increasingly miniaturized pixels of an image-pickup element in the trend toward a larger number of pixels in order to provide a more uniform low-pass effect across the entire image.

Instead of the conditional expression (3), the following conditional expression having a greater refractive index difference is more preferable.

$$0.1 < |n_e - n_o| \quad (3a)$$

The conditional expression (4) is obtained by expressing the characteristics of the configuration of the optical element of this embodiment in numerical terms and indicates the optimum setting range of the angle θ between the optic axis and the normal to the incident surface.

The range specified by the conditional expression (4) facilitates, when obtaining a desired width of separation by selecting the optic axis angle θ for a fixed thickness, designing an optical element in which the change in width of separation with respect to the incident angle is restricted by setting the optic axis angle θ within the above range.

This influence is strong in the range given by the conditional expression (5). In general, the width of separation obtained by such an optical element is set such that it corresponds to the pixel pitch p of the solid-state image-pickup element. When the pixel pitch p becomes smaller, the influence of the change in width of separation on the image becomes undesirably greater.

Furthermore, when the refractive index difference or the thickness of the optical element becomes greater, the change in the width of separation undesirably becomes greater. Therefore, by satisfying the conditional expression (4) particularly in a range where such an influence is strong, a more suitable optical element will be provided.

When an optical element is designed such that it satisfies the conditional expression (5) or designed outside the range of the conditional expression (4) using a medium having refractive index difference of 0.1 or greater, there is provided an optical element that provides a significantly large change in width of separation with respect to the incident angle, especially when a value away from the angle $\theta_{max}$ is set.

For example, when lithium niobate is used to fabricate a 10 μm-thick plane-parallel plate with the optic axis angle set at 15 degrees with respect to the normal to the incident surface, the relationship between the width of separation and the incident angle is that shown in FIG. 9A.

When such an optical element is used to function as an optical low-pass filter, it is expected that the incident angle to the optical element is larger when a certain image-forming optical system is used.

When such an image-forming optical system is used for image pickup, difference in width of separation with respect to the incident angle causes difference in low-pass effect between the periphery and the center of the image. Furthermore, it is expected that the image information becomes asymmetric in the horizontal direction. Moreover, as the width of separation is zero at an incident angle of 35 degrees, the optical element will not function as an optical low-pass filter in that incident angle direction.

When the angle θ is set to a value that satisfies the expression (4), the degradation of the image due to the change in width of separation is eliminated.

For example, when lithium niobate is used to fabricate a 10 μm-thick plane-parallel plate with the optic axis angle set at 74 degrees with respect to the normal to the incident surface, the relationship between the width of separation and the incident angle is that shown in FIG. 9B. Since the change in width of separation with respect to the incident angle is small, the function as an optical low-pass filter will not greatly vary across the entire image, making it possible to produce a higher performance optical low-pass filter.

When a plurality of birefringent plates stacked into a complex crystal plate is used as an optical low-pass filter, a high performance optical low-pass filter will be provided by setting each of the optic axis angles of the constituent birefringent plates to a value that satisfies the condition (4).

Figure 15:
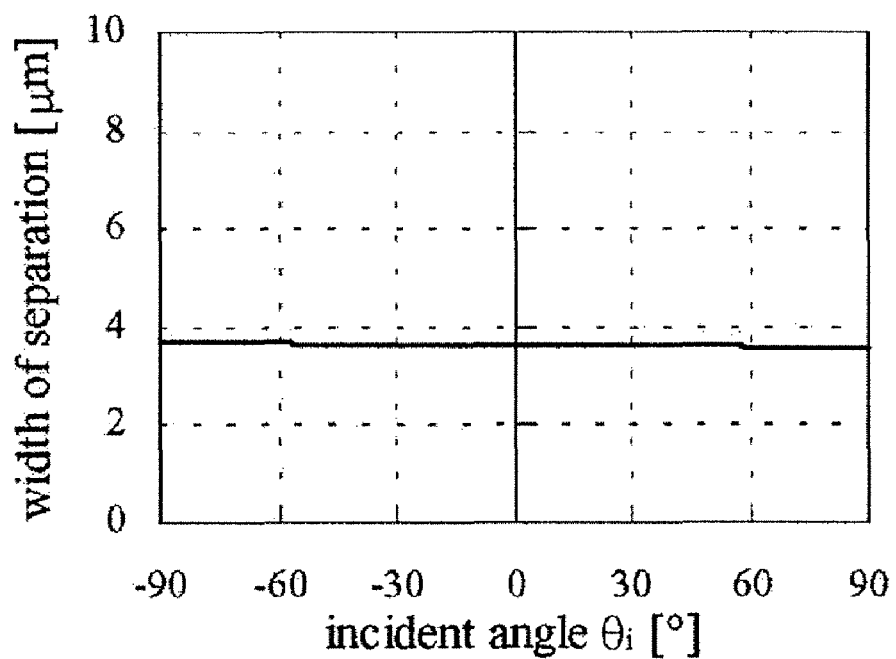
FIG. 15 explains the relationship between the incident angle and the width of separation at a wavelength of 530 nm when the optic axis angle of lithium niobate is set at 55 degrees and the thickness is 100 μm.

An optimum value will be obtained if there is no limitation on the mechanical thickness and the optic axis angle can be freely designed. Suppose now lithium niobate is used and the angle θ between the optic axis and the normal to the incident surface is set at 55 degrees. FIG. 15 shows the relationship between the incident angle and the width of separation for the plane-parallel plate with a thickness of 100 μm. In the figure, the width of separation does not change in a wide incident angle range of ±60 degrees.

Using such an optimum angle allows designing an optical element in which the width of separation effectively dose not change with respect to the incident angle. Similarly, in the case of quartz, the optimum value is obtained when the angle θ between the optic axis and the normal to the incident surface is set at 56 degrees.

In such design, the thickness is changed and adjusted in order to obtain a desired width of separation. Also, by setting the optic axis angle θ within a range of ±5 degrees from the optimum value, it is possible to suppress the variation amount of the width of separation for the incident angle in a range of ±30 degrees within 10% of the width of separation for normal incidence.

For lithium niobate, it is preferable that the angle θ is 50°<θ<60°, more preferably 53°≦θ≦57°. For quartz, it is preferable that the angle θ is 51°<θ<61°, more preferably 54°≦θ≦58°.

Figure 16:
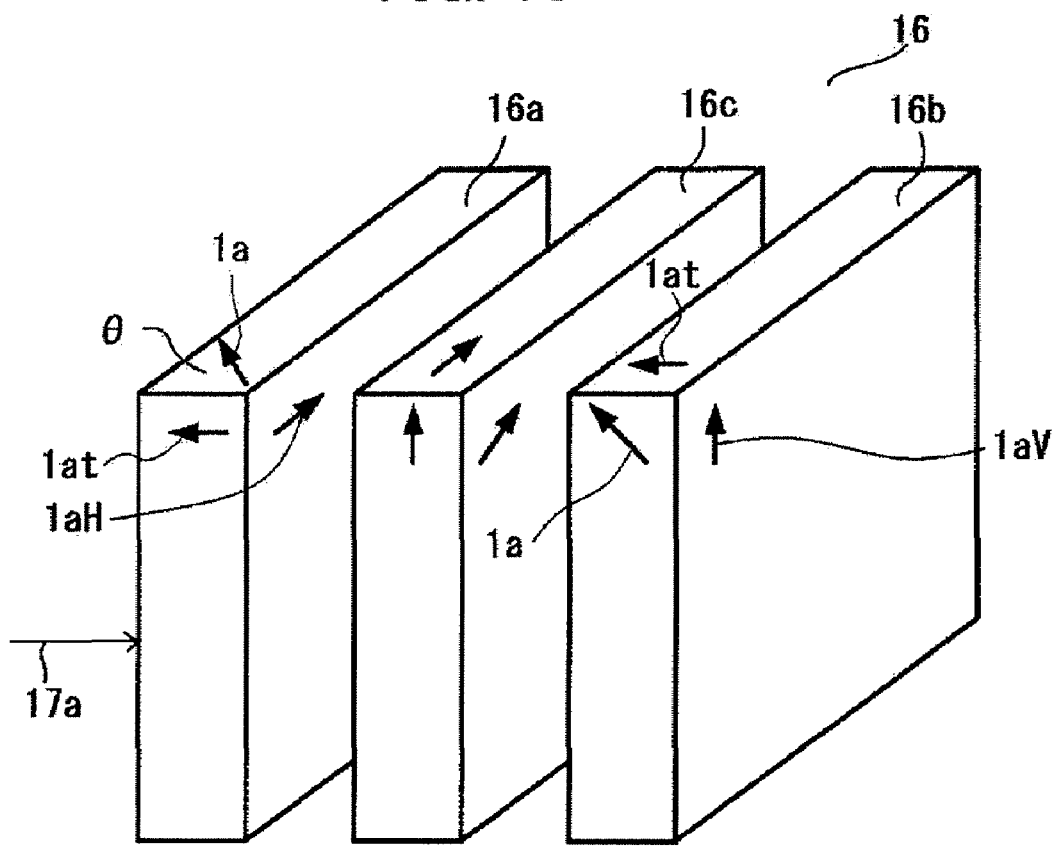
FIG. 16 is a diagrammatic view of an optical element formed of a plurality of substrates that uses optical anisotropy to separate light, the arrow explaining orthogonal projections of the optic axis to respective surfaces.

When a plurality of optical elements each having optical anisotropy are used to configure an optical low-pass filter, it is preferable to arrange them as shown in FIG. 16. That is, the optical low-pass filter is preferably configured to include a first optical element 16a in which the orthogonal projection 1aH of the optic axis 1a to the incident surface is oriented in the direction of the long side of the solid-state image-pickup element and a second optical element 16b in which the orthogonal projection 1aV of the optic axis 1a is oriented in the direction of the short side of the solid-state image-pickup element.

Figure 17:
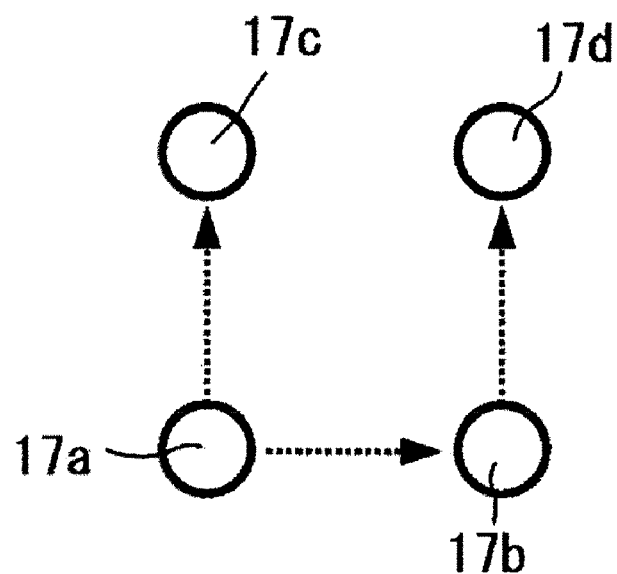
FIG. 17 is a diagrammatic view of exit light when circularly polarized light enters the optical element showing in FIGS. 13A and 13B at the normal angle.

In the above configuration, firstly, light rays 17a entering the first optical element 16a is separated into a light ray 17a that travels without a change of its direction and a light ray 17b that travels in the direction of the long side of the solid-state image-pickup element, as shown in FIG. 17. The separated light rays 17a and 17b oscillate in the directions of the long and short sides of the solid-state image-pickup element, respectively. These two light rays will not be separated even when they merely enter the second optical element 16b.

Therefore, a single crystal 16c having the optic axis oriented in the 45-degree direction with respect to the long side of the solid-state image-pickup element is sandwiched between the first and second optical elements 16a and 16b, allowing the light rays that exit fromthe first optical element 16a to be converted into circularly polarized light. Thus, the second optical element 16b further separates the light rays 17a and 17b into light rays 17c and 17d, respectively, oriented in the shorter side direction of the solid-state image-pickup element.

In this way, a three-layered optical low-pass filter 16 is constructed. The light ray 17a entering the optical low-pass filter 16 is separated into four light rays 17a to 17d that exit therefrom in the form of square as shown in FIG. 17. Thus, there is provided an optical low-pass filter (optical element) having a light separation effect in two-dimensional directions.

Specific embodiments of the optical element of the present invention will now be described.

Embodiment 1

Figure 18A:
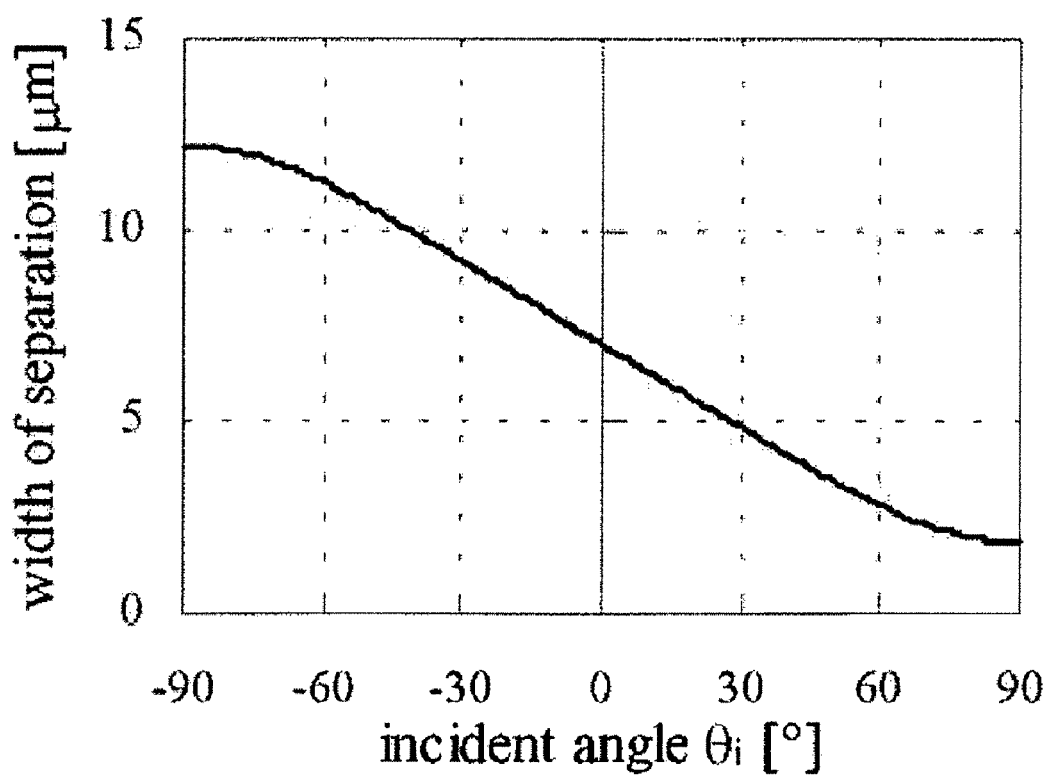
FIGS. 18A and 18B explain the relationship between the incident angle and the width of separation at a wavelength of 530 nm when the thickness of lithium niobate is 100 μm and the optic axis angle is set (18A) at 31 degrees and (18B) at 57 degrees.
Figure 18B:
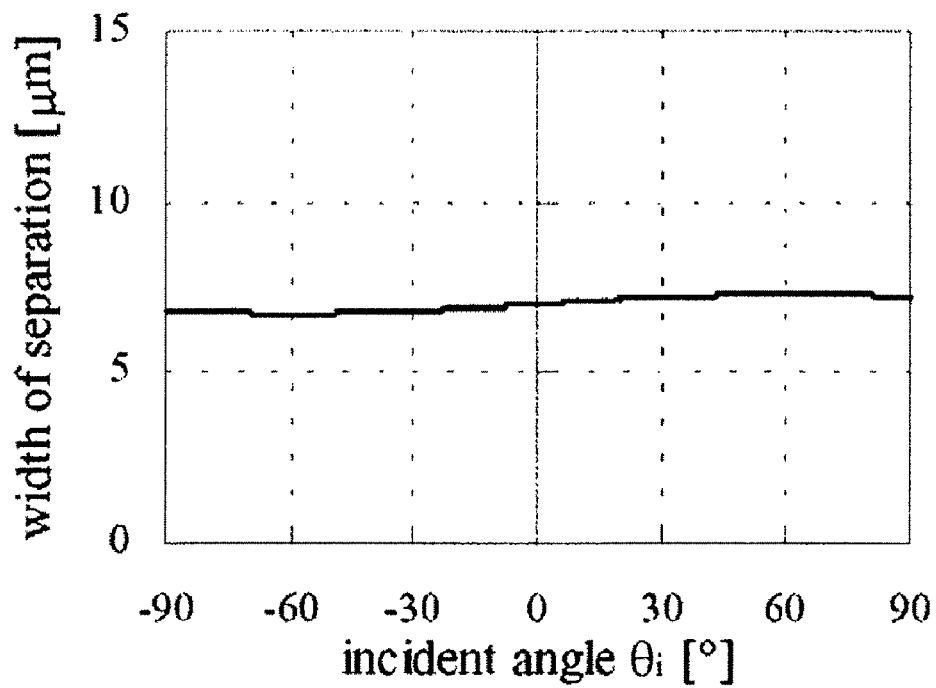

When the desired width of separation is 7 μm and the thickness t of the optical element (plane-parallel plate) is 200 μm, the required width of separation per unit thickness is 0.035 mm. When lithium niobate is used as the anisotropic medium, the angle between the normal to the incident surface and the optic axis is 31 or 57 degrees from FIG. 7. FIGS. 18A and 18B show the relationship between the incident angle and the width of separation ΔL. When the pixel pitch of the solid-state image-pickup element is 7 μm, p/t becomes 0.035. Since $\theta_{max}$ is 45 degrees, the optic axis angle θ that satisfies the condition of the expression (4), $\theta_{max}<\theta$, is 57 degrees. When the image-pickup optical system has an angle of view of ±30 degrees, the variation in width of separation with respect to the incident angle is 1 μm or smaller at the right and the left (at ±30 degrees).

If the optic axis angle θ is set at 31 degrees, the amount of deviation of the width of separation at the right and the left (at ±30 degrees) is 4 μm. It is seen that this deviation is greater than one-half the pixel pitch, so that the optical low-pass filter effect greatly changes. Since such variation is preferably small, the optic axis angle is desirably set at 57 degrees.

When the same optical element is combined with a solid-state image-pickup apparatus having a pixel pitch of 10 μm, the variation in width of separation is reduced to one-half the pixel pitch or smaller. In this case, p/t is 0.05.

In this embodiment and the following embodiments, when the material of the optical element is lithium niobate, the angle θ between the optic axis direction and the normal to the incident surface of the optical element is designed to satisfy the following condition: 50°<θ<60°, preferably, 53°≦θ≦57°.

Embodiment 2

When the desired width of separation is 7 μm and the thickness t of the optical element (plane-parallel plate) is 400 μm, the required width of separation per unit thickness is 0.0175 mm.

Figure 19A:
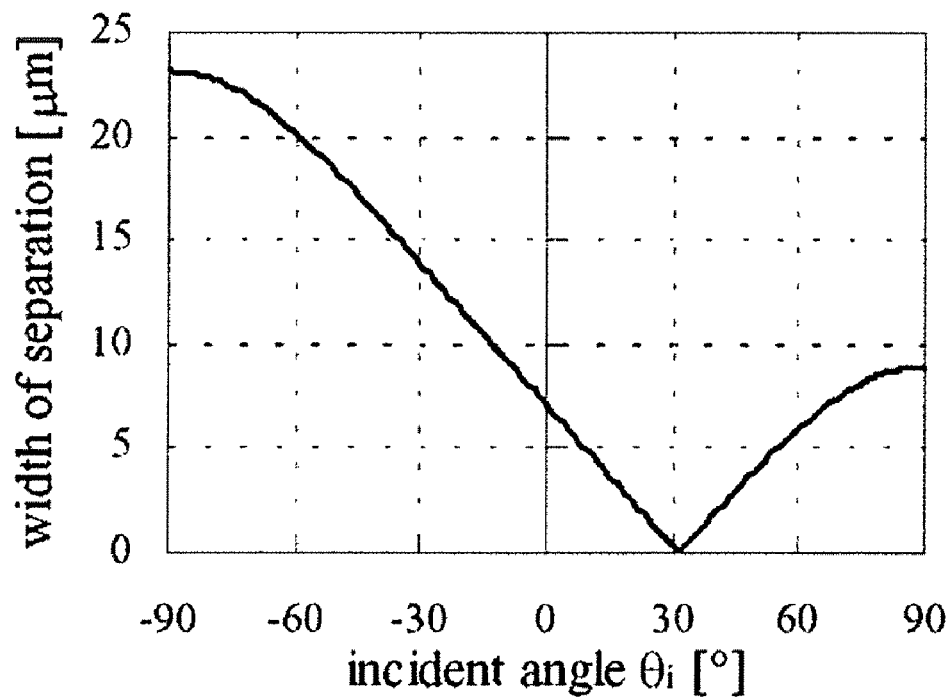
FIGS. 19A and 19B explain the relationship between the incident angle and the width of separation at a wavelength of 530 nm when the thickness of lithium niobate is 100 µm and the optic axis angle is set (19A) at 13 degrees and (19B) at 76 degrees.
Figure 19B:
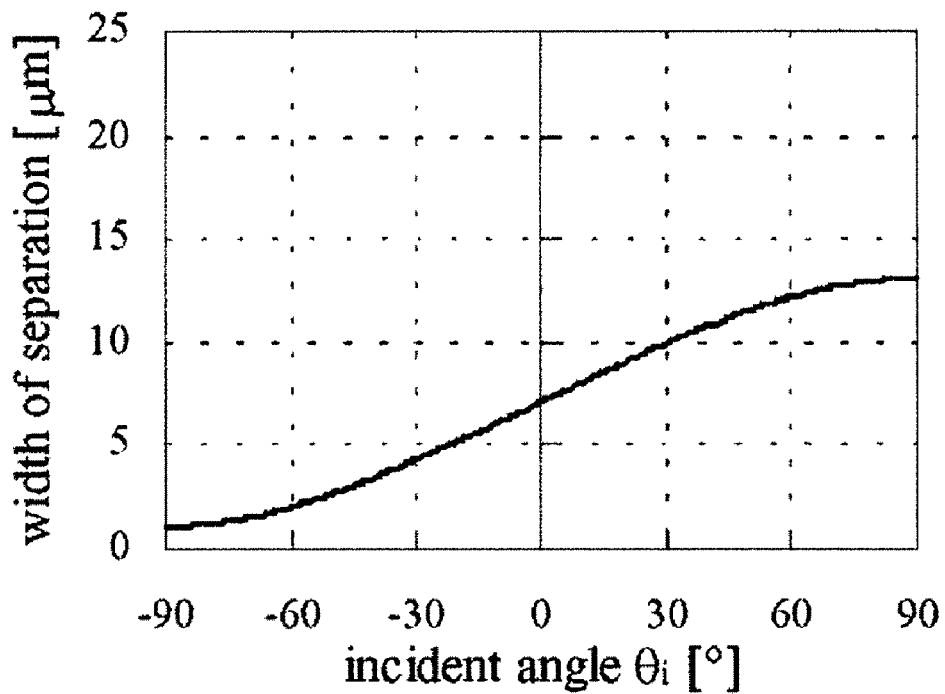

When lithium niobate is used as the anisotropic medium, the angle between the normal to the incident surface and the optic axis is 13 or 76 degrees from FIG. 7. FIGS. 19A and 19B show the relationship between the incident angle and the width of separation ΔL. When the pixel pitch of the solid-state image-pickup element is 7 μm, p/t becomes 0.0175.

The optic axis angle θ that satisfies the condition of the expression (4), $\theta_{max}<\theta$, is 76 degrees. When the optic axis angle θ is set at 13 degrees, the width of separation becomes zero at an incident angle of 30 degrees. At that angle, the optical element does not function as an optical low-pass filter, so that such design is not preferable. Thus, the optic axis angle is desirably set at 76 degrees.

Embodiment 3

When the desired width of separation is 5 μm and the thickness t of the optical element (plane-parallel plate) is 20 μm, the required width of separation per unit thickness is 0.25 mm.

Figure 20A:
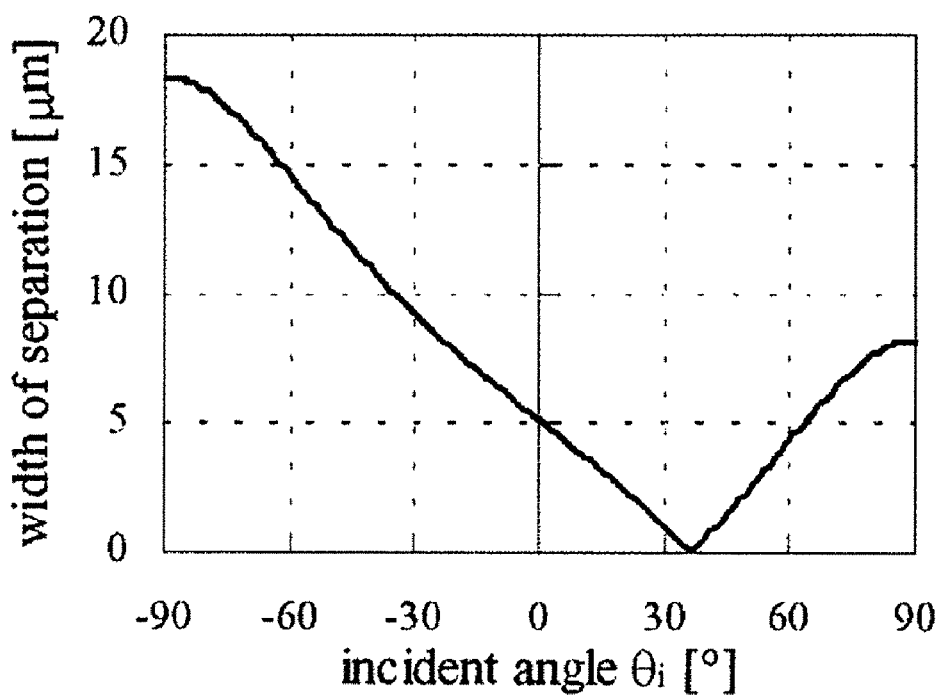
FIGS. 20A and 20B explain the relationship between the incident angle and the width of separation at a wavelength of 530 nm using $TiO_2$ structural anisotropy when the thickness is 20 µm and the optic axis angle is set (20A) at 19 degrees and (20B) at 57 degrees.
Figure 20B:
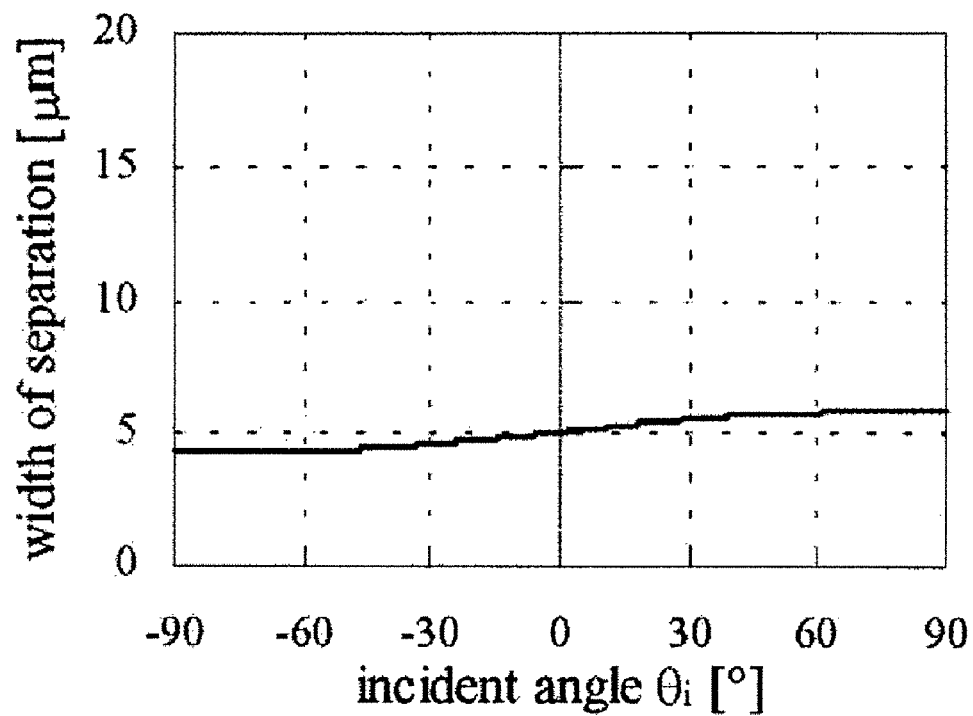

A case is described where the optical element made of $TiO_2$ and having optical anisotropy of a one-dimensional periodic structure with a structural pitch of 80 nm and an occupancy rate of 50% as shown in FIG. 10 is used. In this configuration, the angle between the normal to the incident surface and the optic axis is 19 or 57 degrees from FIG. 11. FIGS. 20A and 20B show the relationship between the incident angle and the width of separation.

The optic axis angle θ that satisfies the condition of the expression (4), $\theta_{max}<\theta$, is 57 degrees. When the optic axis angle is set at 19 degrees, the width of separation becomes zero at an incident angle of 35 degrees. At that angle, the optical element does not function as an optical low-pass filter, so that such design is not preferable. Thus, the optic axis angle is desirably set at 57 degrees.

Embodiment 4

A case is described where the desired width of separation is 7 μm and the thickness of the optical element (plane-parallel plate) is not limited.

Figure 21:
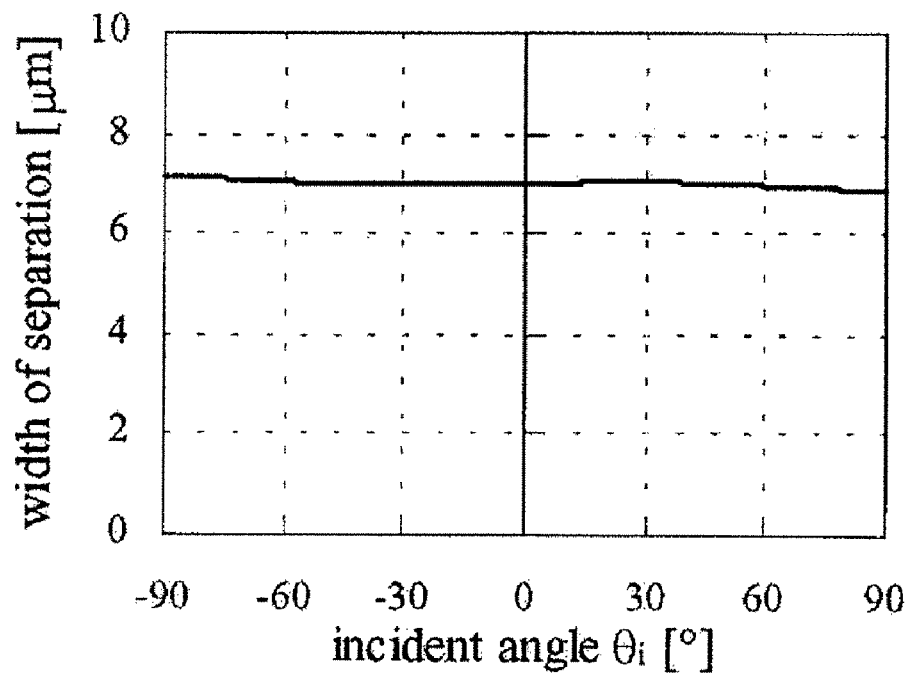
FIG. 21 explains the relationship between the incident angle and the width of separation at a wavelength of 530 nm when the optic axis angle of lithium niobate is set at 54 degrees and the thickness is 193 µm.

When lithium niobate is used as the anisotropic medium, the angle between the normal to the incident surface and the optic axis is set at 55 degrees. In this case, the width of separation per unit thickness is 0.0363 mm. The desired width of separation will be provided by selecting the thickness to be 193 μm. FIG. 21 shows the relationship between the incident angle and the width of separation. It is seen that the width of separation does not change with respect to the incident angle.

Embodiment 5

Figure 22:
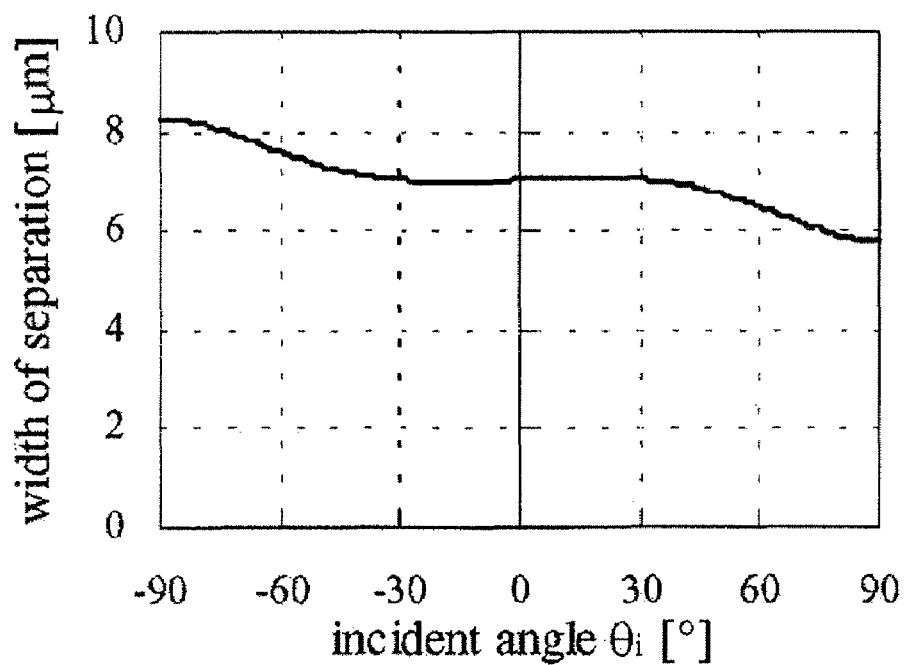
FIG. 22 explains the relationship between the incident angle and the width of separation at a wavelength of 530 nm when the optic axis angle of quartz is set at 54 degrees and the thickness is 1200 µm.

A case is described where the desired width of separation is 7 μm and the thickness of the optical element (plane-parallel plate) is not limited. When quartz is used as the anisotropic medium, the angle θ between the normal to the incident surface and the optic axis is set at 56 degrees. In this case, the width of separation per unit thickness is 0.00547 mm. The desired width of separation will be provided by selecting the thickness to be 1280 μm. FIG. 22 shows the relationship between the incident angle and the width of separation. It is seen that the width of separation does not change widely with respect to the incident angle.

In this embodiment, when the material of the optical element is quartz, the angle θ between the optic axis direction and the normal to the incident surface of the optical element is designed to satisfy the following condition: 51°<θ<61°, preferably, 53°≦θ≦57°.

As described above, according to the embodiments, when optical anisotropy is used to separate light, the relationship between the optic axis and the normal to the incident surface is appropriately set such that variation in width of separation with respect to the incident angle can be reduced, thereby providing an optical element having an excellent optical low-pass filter effect.

Embodiment 6

Figure 23:
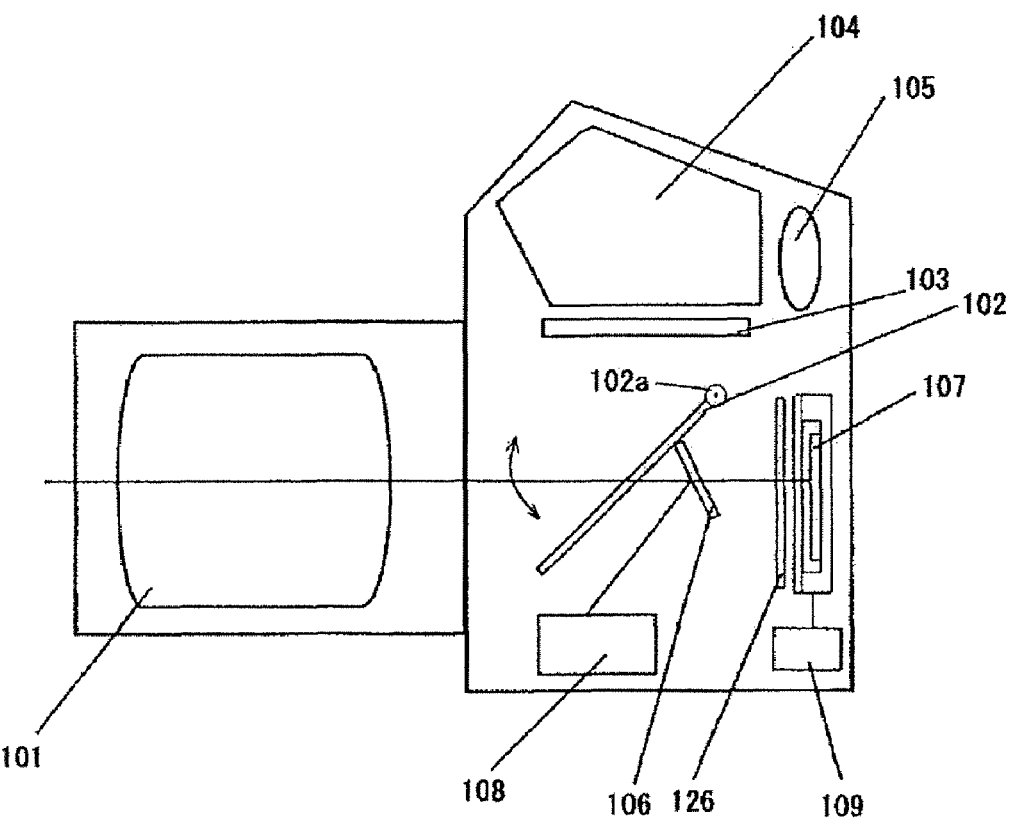
FIG. 23 explains an image-pickup apparatus having the optical element, which is an embodiment of the present invention.

FIG. 23 is a schematic view of the main portion of a digital single lens reflex camera, which is a sixth embodiment of the present invention, that has an image-pickup lens 101 with a built-in optical element having an optical low-pass filter effect according to the present invention.

In FIG. 23, 101 denotes an interchangeable image-pickup lens. 102 denotes a rotary mirror (quick-return mirror) that pivots around an axis of rotation 102a, part of which has a half-mirror surface. 103 denotes a focusing screen (focusing plate), on which an object image is formed through the image-pickup lens 101. 104 denotes a pentagonal prism (image inversion member), which converts the object image formed on the focusing screen 103 into an erect image.

105 denotes an eyepiece lens, through which the object image formed on the focusing screen 103 is observed through the pentagonal prism 104. 106 denotes a sub-mirror that is attached to the rotary mirror 102 and pivots along with the rotary mirror 102. 108 denotes a focus detection unit, which detects the focusing state of the image-pickup lens 101 by using part of the light that passed through the image-pickup lens 101, specifically the light that passes through part of the rotary mirror 102 and was reflected by the sub-mirror 106.

126 denotes the optical element. 107 denotes a solid-state image-pickup element. 109 denotes an image processing unit, which processes the signal from the solid-state image-pickup element 107 to provide image information.

In this embodiment, when the object image is observed through a viewfinder, the optical image passing through the image-pickup lens 101 is reflected by the rotary mirror 102, focused on the focusing screen 103 and then observed through the pentagonal prism 104 and the eyepiece lens 105.

Focus detection of the image-pickup lens 101 is performed by processing an image that passed through the half-mirror surface of the rotary mirror 102 and was reflected by the sub-mirror 106 to the focus detection unit 108 that is disposed below a mirror box.

On the other hand, when an image is picked up, the rotary mirror 102 and the sub-mirror 106 integrally pivot around and retract from the image-pickup optical path. Then, the light from the image-pickup lens 101 enters the optical element 126 and exits therefrom with desired blur, and the object image is focused on the image-pickup element 107. The picked up image is converted into an electrical signal, subjected to digital image processing in the image processing unit 109, and is stored on a storage medium (not shown).

Furthermore, the present invention is not limited to these preferred embodiments and various variations and modifications may be made without departing from the scope of the present invention.

This application claims foreign priority benefits based on Japanese Patent Application No. 2005-282007, filed on Sep. 28, 2005, which is hereby incorporated by reference herein in its entirety as if fully set forth herein.

What is claimed is:

1. An optical element having optical anisotropy, the optical element separating entering light into light rays having polarization directions perpendicular to each other such that the light rays are separated by a specific width and exit from the optical element, wherein the optical element satisfies the following conditions:

$$0.1 < |n_e - n_o|$$

$$\theta_{max} < \theta$$

where $n_o$ and $n_e$ represent refractive indices for ordinary and extraordinary rays at a wavelength of 530 nm, $\theta$ represents an angle between the direction of an optic axis of the optical element and a normal to an incident surface of the optical element, and $\theta_{max}$ represents an angle between the direction of the optic axis and the normal to the incident surface at which the angle of separation is maximized when the light that enters the incident surface of the optical element at the normal angle is separated into the light rays having the polarization directions perpendicular to each other.

2. The optical element according to claim 1, wherein the optical element is one of a resin film and a one-dimensional periodic structure in which grating components smaller than the wavelength of the entering light are arranged with a constant pitch.

3. An optical element separating entering light into light rays having polarization directions perpendicular to each other such that the light rays are separated by a specific width and exit from the optical element, wherein the optical element satisfies the following condition:

$$50° < \theta < 60°$$

where the optical element is made of lithium niobate, and $\theta$ represents an angle between the direction of an optic axis of the lithium niobate and a normal to an incident surface of the optical element.

4. An optical element separating entering light into light rays having polarization directions perpendicular to each other such that the light rays are separated by a specific width and exit from the optical element, wherein the optical element satisfies the following condition:

$$51° < \theta < 61°$$

where the optical element is made of quartz, and $\theta$ represents an angle between the direction of an optic axis of the quartz and a normal to an incident surface of the optical element.

5. An image-pickup member comprising:
   the optical element according to claim 1; and
   a solid-state image-pickup element,
   wherein the optical element is located on the light-entering side of the solid-state image-pickup element.

6. An image-pickup apparatus which uses the image-pickup member according to claim 5 to photoelectrically convert an optical image formed by an image-pickup optical system.

7. An image-pickup member comprising:
   the optical element according to claim 3; and
   a solid-state image-pickup element,
   wherein the optical element is located on the light-entering side of the solid-state image-pickup element.

8. An image-pickup apparatus which uses the image-pickup member according to claim 7 to photoelectrically convert an optical image formed by an image-pickup optical system.

9. An image-pickup member comprising:
   the optical element according to claim 4; and
   a solid-state image-pickup element,
   wherein the optical element is located on the light-entering side of the solid-state image-pickup element.

10. An image-pickup apparatus which uses the image-pickup member according to claim 9 to photoelectrically convert an optical image formed by an image-pickup optical system.

11. An image-pickup apparatus comprising:
    an optical element having optical anisotropy; and
    a solid-state image-pickup element which receives an optical image formed by an image-pickup optical system through the optical element,
    wherein the image-pickup apparatus satisfies the following conditions:

$$0.02 < |n_e - n_o|$$

$$\theta_{max} < \theta$$

$$p/t < 0.035$$

where $n_o$ and $n_e$ represent refractive indices for ordinary and extraordinary rays at a wavelength of 530 nm, $\theta$ represents an angle between the optic axis direction of the optical element and the normal to the incident surface of the optical element, $\theta_{max}$ represents the angle between the direction of an optic axis and a normal to an incident surface at which the angle of separation is maximized when light that enters the incident surface of the optical element at the normal angle is separated into light rays having polarization directions perpendicular to each other, t represents the thickness of the optical element in the direction of the normal to the incident surface, and p represents the pixel pitch of the solid-state image-pickup element in the direction of the light separation.

\* \* \* \* \*